US007660001B2

(12) United States Patent  
Kurohata et al.

(10) Patent No.: US 7,660,001 B2
(45) Date of Patent: Feb. 9, 2010

(54) IMAGE FORMING APPARATUS AND IMAGE FORMING METHOD CAPABLE OF READING IMAGE DATA FROM DOCUMENT BUNDLE INCLUDING DOCUMENT WITH TAB

(75) Inventors: Takao Kurohata, Hino (JP); Jun Yokobori, Sagamihara (JP); Yoshihisa Kamata, Hadano (JP)

(73) Assignee: Konica Minolta Business Technologies, Inc. (JP)

( * ) Notice: Subject to any disclaimer, the term of this patent is extended or adjusted under 35 U.S.C. 154(b) by 821 days.

(21) Appl. No.: 11/258,643

(22) Filed: Oct. 25, 2005

(65) Prior Publication Data

US 2006/0164696 A1   Jul. 27, 2006

(30) Foreign Application Priority Data

Jan. 26, 2005   (JP) ............................. 2005-018411

(51) Int. Cl.
G06F 3/12 (2006.01)
(52) U.S. Cl. .................. 358/1.13; 358/1.1; 358/1.18; 358/474; 399/82; 399/361; 399/367; 399/382
(58) Field of Classification Search ....... 358/1.11–1.18, 358/474, 498; 399/82, 367, 382, 389, 361, 399/391
See application file for complete search history.

(56) References Cited

U.S. PATENT DOCUMENTS

| 5,722,029 | A  | * | 2/1998 | Tomidokoro et al. ........ 399/389 |
| 6,782,218 | B2 | * | 8/2004 | Sekiguchi et al. ............. 399/81 |
| 7,097,369 | B2 | * | 8/2006 | Barry et al. ................... 400/62 |
| 7,317,551 | B2 | * | 1/2008 | Masaki ....................... 358/1.18 |
| 7,380,788 | B2 | * | 6/2008 | Ueda et al. ............. 271/265.01 |
| 2003/0026626 | A1 | * | 2/2003 | Sunada et al. ................. 399/82 |
| 2004/0130088 | A1 | * | 7/2004 | Sato et al. .................. 271/3.14 |

FOREIGN PATENT DOCUMENTS

| JP | 09-258615 | 10/1997 |
| JP | 2002-359720 | 12/2002 |

* cited by examiner

Primary Examiner—Kimberly A Williams
(74) Attorney, Agent, or Firm—Squire, Sanders & Dempsey L.L.P.

(57) ABSTRACT

An image forming apparatus includes: a document conveyance section for conveying a document of a document bundle to a document reading position; a reading section for reading the document in the document bundle to obtain image of the document; a designation section for designating to read a first document of the document bundle as a document with a tab; and a reading control section for controlling the reading section to read image for a whole document area of the first document including a tab potion, when designated by the designation section.

22 Claims, 8 Drawing Sheets

| 131a MODE INFORMATION | | 131b DOCUMENT TYPE INFORMATION | ... | 131c | | | ... | 131d OUTPUT GROUP No. |
|---|---|---|---|---|---|---|---|---|
| 131a1 READING MODE INFORMATION | 131a2 FORMING MODE INFORMATION | | | 131c1 FIRST IMAGE DATA | 131c2 SECOND IMAGE DATA | 131c3 THIRD IMAGE DATA | | |
| 1 | 1 | 1 | ... | *** | *** | | ... | 1 |
| 0 | 0 | 0 | ... | | | | ... | 2 |
| ... | ... | ... | ... | ... | ... | ... | ... | ... |

IMAGE FORMING APPARATUS AND IMAGE FORMING METHOD CAPABLE OF READING IMAGE DATA FROM DOCUMENT BUNDLE INCLUDING DOCUMENT WITH TAB

BACKGROUND

The present invention relates to an image forming apparatus and an image forming method.

Heretofore, there has been known an image forming apparatus dealing with a sheet having a tab. Such an image forming apparatus, specifically for example, is equipped with a sensor to discriminate between a document with tab and a normal document in Japanese Patent Publication Laid-Open No. HEI 9-258615. Thus, the cost of the image forming apparatus was disadvantageously increased due to the sensor equipped.

In order to cope with the above problem, for example, there has been proposed an image forming apparatus capable of handling a sheet having a tab without being equipped with the sensor by causing a document with a tab and a bundle of normal documents to be read separately in Japanese Patent Publication Laid-Open No. 2002-359720.

However, the above image forming apparatus as described in Japanese Patent Publication Laid-Open No. 2002-359720 cannot take advantage of a document conveyance mechanism provided in the image forming apparatus. More particularly, the apparatus cannot read at once the document with tab and a bundle of the normal documents sequentially in order of the documents, for example, first reading image data from the document with tab which has been set in the document conveyance mechanism, followed by reading image data from the normal document bundle which has been set in the document conveyance mechanism. Thus, there is a problem that work and time are required to sort the sheets with images formed thereon and thereby the image forming cannot be effectively carried out.

SUMMARY

There is a need to provide an image forming apparatus and an image forming method capable of reading image data from a document bundle including a document with tab more inexpensively and more effectively.

The present invention provides an image forming apparatus includes: (a) a document conveyance section for conveying a document of a document bundle to a document reading position; (b) a reading section for reading the document in the document bundle conveyed by the document conveyance section to obtain image data of the document; (c) a designation section for designating to read a first document of the document bundle as a document with a tab; (d) a reading control section for controlling the reading section to read image data for a whole document area of the first document including a tab potion, from the first document in the document bundle conveyed from the document conveyance section, when designated by the designation section; and (e) an image forming section for forming an image based on the image data onto a sheet.

The present invention further provides an image forming method includes the steps of: (a) designating to read a first document in a document bundle as a document with a tab; (b) conveying a document in the document bundle to a document reading position by a document conveyance section; (c) reading a whole document area of the first document including a tab portion in the document bundle which has been conveyed to obtain image data; (d) reading a document other than the first document in the document bundle at the document reading position to obtain image data; and (e) forming an image based on the image data onto a sheet.

The present invention further provides an image forming method includes the steps of: (a) designating to read a first document in a document bundle as a document with a tab; (b) conveying a document in the document bundle to a document reading position by a document conveyance section; (c) reading a whole document area of the first document including a tab portion in the document bundle which has been conveyed to obtain image data, and reading a document other than the first document in the document bundle to obtain image data at the document reading position to obtain image data; and (d) forming an image based on the image data of the first document in the document bundle, onto a first type of sheet accommodated in a first sheet feeding tray, and forming the image based on the image data of a document other than the first document in the document bundle, onto a second type of sheet accommodated in a second sheet feeding tray, wherein the image forming step is carried out after image data of a plurality of document bundles are read by repeating the document conveying step, the reading step and the image data storing step.

DETAILED DESCRIPTION OF THE PREFERRED EMBODIMENTS

Hereinafter the preferred embodiments of an image forming apparatus and an image forming method according to the present invention will be described in detail with reference to the drawings. It is to be noted that the scope of the invention is not limited to the drawings.

(Image Forming Apparatus)

Figure 1:
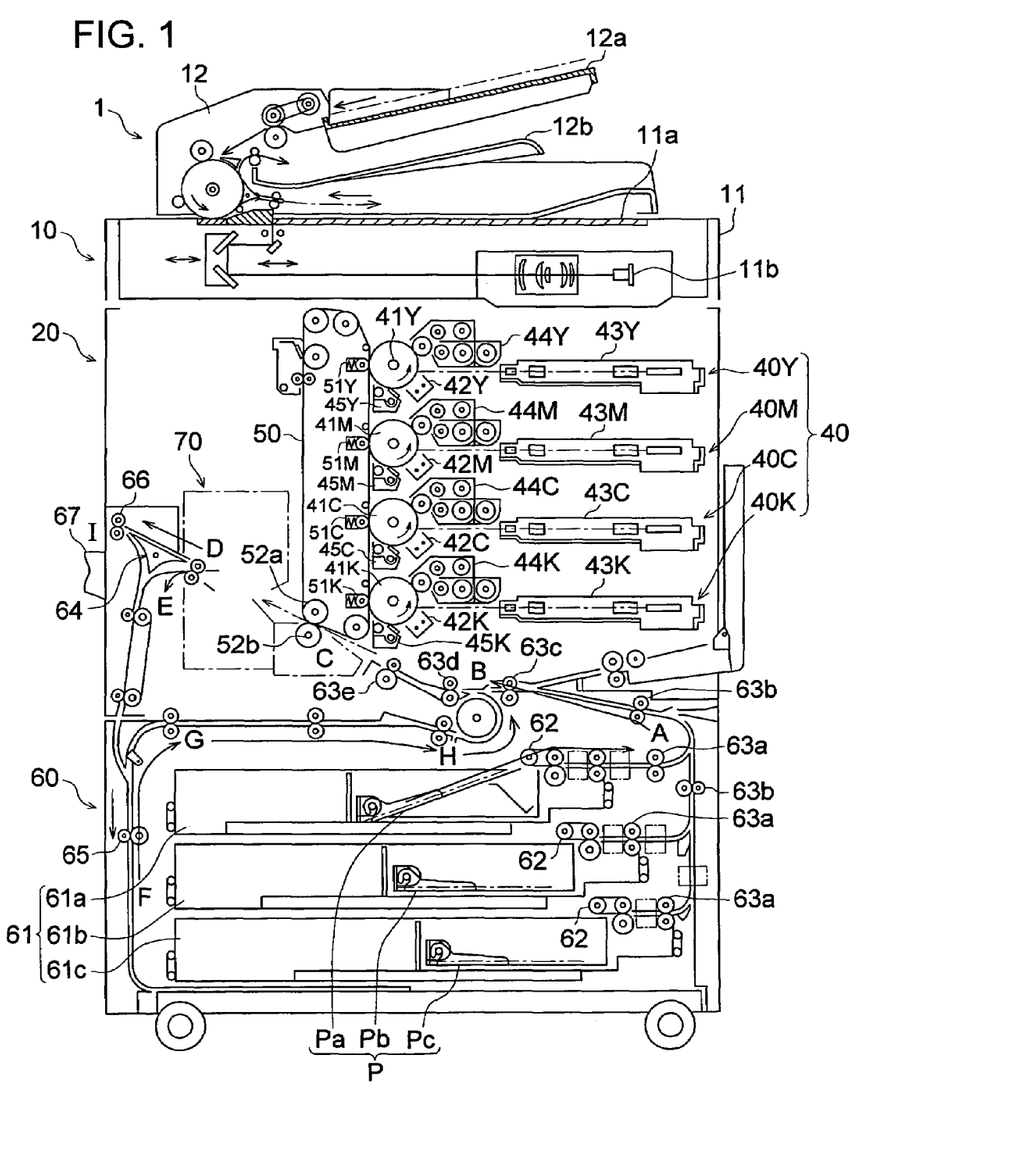
FIG. 1 is a cross-sectional view showing the internal configuration of an image forming apparatus in an embodiment of the present invention.

An image forming apparatus 1 is provided, for example, as shown in FIG. 1, with an image reading section 10 and an image forming apparatus main body 20 and the like. The image reading section 10, for example, is disposed on an upper portion of the image forming apparatus main body 20 as shown in FIG. 1.

The image reading section 10 is provided, for example, with a scanner 11, a scanner cover 12 and the like as shown in FIG. 1. The scanner 11 and the scanner cover 12 operate in accordance with an instruction from a control section 100 of the image forming apparatus 1 shown in FIG. 2.

The scanner 11, which is a reading section, reads image data at a document reading position from a document in a document bundle conveyed from the scanner cover 12 which is an automatic document conveyance section in accordance with the instruction from the control section 100 and outputs the image data read as described above to the control section 100.

More particularly, for example, in the scanner 11, a light is projected to the document at the document reading position on a platen glass 11a to read the reflection of the light by a CCD 11b. The reflection read by the CCD 11b is photoelectrically converted into image data.

The scanner cover 12 is openably mounted to an upper portion of the scanner 11. The scanner cover 12 is the automatic document conveyance section and is provided with a document conveyance mechanism that automatically conveys the documents in the document bundle to the document reading position on the platen glass 11a in accordance with the instruction from the control section 100.

More particularly, for example, the scanner cover 12 automatically conveys the documents in the document bundle placed on a document feeding tray 12a one by one to the document reading position on the platen glass 11a of the scanner 11. When the image data reading from the document by the scanner 11 is completed, the scanner cover 12 is designed to be able to feed the document out to a document delivery tray 12b.

In other words, the scanner 11 is designed to be able to read image data from one side or both sides of a single document or several documents at once by the scanner cover 12.

The image forming apparatus main body 20 is equipped inside with an image forming section 40, an intermediate transfer belt 50, a sheet feeding section 60, a fixing section 70 and the like. Each of the sections provided inside the image forming apparatus main body 20 forms and outputs an image, for example, based on the image data read in the scanner 11 of the image reading section 10 on a sheet P in accordance with the instruction from the control section 100.

The image forming section 40 forms images (an image of yellow (Y), an image of magenta (M), an image of cyan (C), an image of black (K)) based on the image data in accordance with the instruction from the control section 100.

More particularly, of the image forming section 40, a yellow image forming section 40Y is provided with a photoreceptor drum 41Y, an electrostatic charger 42Y, an exposure device 43Y, a developing device 44Y, a cleaning device 45Y and other related components and forms an image of yellow (Y).

The photoreceptor drum 41Y has a characteristic that the electric charge varies when the light hits on the drum.

The electrostatic charger 42Y uniformly charges an outer surface of the photoreceptor drum 41Y.

The exposure device 43Y projects the light onto the photoreceptor drum 41Y charged by the electrostatic charger 42Y to cause an electrostatic latent image to be formed thereon.

The developing device 44Y causes a charged toner (a yellow (Y) toner) to adhere to the surface of the photoreceptor drum 41Y with the electrostatic latent image formed thereon by the exposure device 43Y to develop the electrostatic latent image.

The cleaning device 45Y cleans the surface of the photoreceptor drum 41Y by removing remaining electric charge and residual toner and the like on the surface of the photoreceptor drum 41Y after the toner that is attached to the surface of the photoreceptor drum 41Y by the developing device 44Y is transferred onto the intermediate transfer belt 50.

Further, of the image forming section 40, a magenta image forming section 40M is provided, similar to the yellow image forming section 40Y, with a photoreceptor drum 41M, an electrostatic charger 42M, an exposure device 43M, a developing device 44M, a cleaning device 45M and other related components and forms an image of magenta (M).

Of the image forming section 40, a cyan image forming section 40C is provided, similar to the yellow image forming section 40Y, with a photoreceptor drum 41C, an electrostatic charger 42C, an exposure device 43C, a developing device 44C, a cleaning device 45C and other related components and forms an image of cyan (C).

Of the image forming section 40, a black image forming section 40K is provided, similar to the yellow image forming section 40Y, with a photoreceptor drum 41K, an electrostatic charger 42K, an exposure device 43K, a developing device 44K, a cleaning device 45K and other related components and forms an image of black (K).

The intermediate transfer belt 50 is rotatably supported by a plurality of rollers and is designed to rotate in association with the rotation of the plurality of rollers based on the instruction from the control section 100. Further, the intermediate transfer belt 50 is designed to be pressure-contacted to the photoreceptor drums 41Y, 41M, 41C, 41K due to the operations of primary transfer rollers 51Y, 51M, 51C, 51K based on the instruction from the control section 100 respectively.

In other words, the toner images of yellow (Y), magenta (M), cyan (C), and black (K) each developed on the surfaces of the photoreceptor drums 41Y, 41M, 41C, and 41K are subjected to transfer (primary transfer) onto the intermediate transfer belt 50 at pressure-contacted positions by the primary transfer rollers 51Y, 51M, 51C, and 51K, respectively. Further, the toner images are subjected to primarily transfer with sequentially superimposed on the intermediate transfer belt 50 by the rotation of the intermediate transfer belt 50 in association with the rotation of the plurality of the rollers and then are conveyed to secondary transfer rollers 52a, 52b respectively. The toner images sequentially superimposed and transferred onto the intermediate transfer belt 50 are subjected to transfer (secondary transfer) on one face of the sheets P in batch by the secondary transfer rollers 52a, and 52b.

The sheet feeding section 60 is provided with a sheet feeding tray 61, feeding roller 62, sheet feeding roller 63a, conveyance roller 63b, 63c, 63d, registration roller 63e, a branch point 64, reversal control roller 65, sheet feeding roller 66, a sheet delivery tray 67 and other related components. The sheet feeding section 60 is designed to be able to feed the sheet P accommodated in the sheet feeding tray 61 out to the sheet feeding tray 67 in accordance with the instruction from the control section 100, for example, along a predetermined feeding path (from the point A to the point I) as shown in FIG. 1.

More particularly, in the case where an image is formed and outputted on one side of the sheet P, the sheet P is conveyed from the sheet feeding tray 61 to the branch point 64 through the points A, B, C, and D. Further, the sheet P is conveyed in the direction of the point I at the branch point 64 and delivered to the sheet delivery tray 67.

On the other hand, in the case where images are formed and outputted on both sides of the sheet P, the sheet P is conveyed to the branch point 64 through the points A, B, C, and D. The sheet P is conveyed in the direction of the point E at the branch point 64 and conveyed again to the branch point 64 through the points F, G, H, B, C, and D. Further, the sheet P is conveyed in the direction of the point I at the branch point 64 and delivered to the sheet delivery tray 67.

The sheet feeding tray 61 specifically is constituted, for example, by a first sheet feeding tray 61a, a second sheet feeding tray 61b, a third sheet feeding tray 61c and the like as shown in FIG. 1. The first sheet feeding tray 61a accommodates first sheet Pa. The second sheet feeding tray 61b accommodates second sheet Pb. The third sheet feeding tray 61c accommodates third sheet Pc. Incidentally, it is assumed that the first sheet Pa is a sheet with a tab, the second sheet Pb is a normal sheet without tab.

The fixing section 70 heats, for example, the sheet P with an image subjected to the secondary transfer from the intermediate transfer belt 50 by secondary transfer rollers 52a, 52b, namely the sheet P with the image formed thereon. The image formed on the sheet P is designed to be fixed to the sheet P due to heating by the fixing section 70.

(Control Section of the Image Forming Apparatus)

Figure 2:
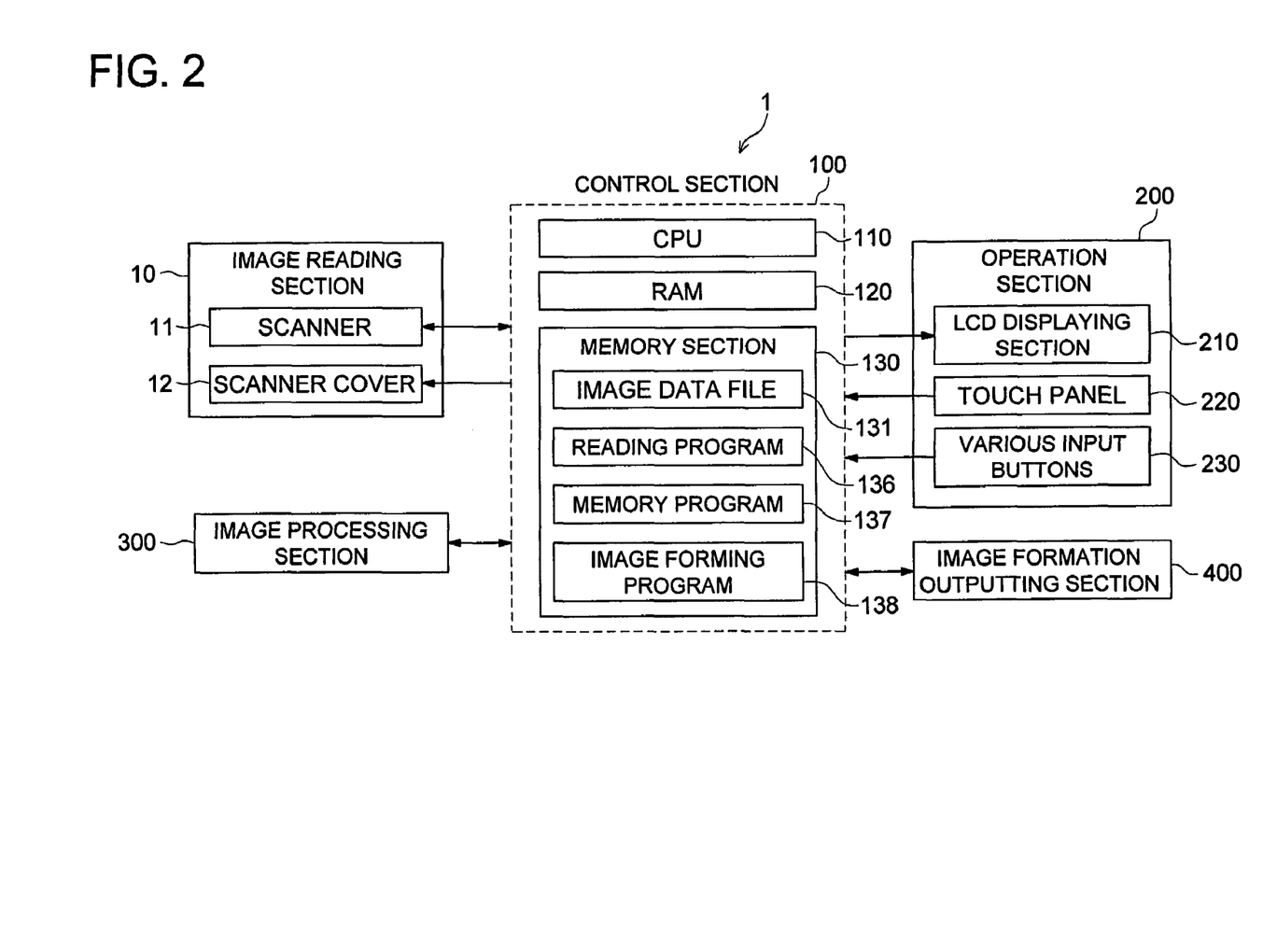
FIG. 2 is a block diagram showing the functional configuration of a control section of the image forming apparatus in the embodiment of the present invention.

The control section 100 of the image forming apparatus 1 is coupled, for example, to the image reading section 10, an operation section 200, an image processing section 300, an image forming output section 400 and other related sections as shown in FIG. 2.

The control section 100 has, for example, a CPU (Central Processing Unit) 110, a RAM (Random Access Memory) 120, a memory section 130 and the like as shown in FIG. 2.

The CPU 110 provides various types of controls in accordance with different processing programs for the image forming apparatus 1 that are stored in the memory section 130.

The RAM 120 includes a program storage region for deploying the processing programs and the like executed by the CPU 110, a data storage region for storing processing results and the like that are generated when the input data and the above processing programs are executed.

The memory section 130 stores a system program executable in the image forming apparatus 1, different processing programs executable in the system program, data used in the execution of these different processing programs, data of the processing results computed and processed by the CPU 110 and the like. Incidentally, the programs are stored in the memory section 130 in the form of program code that the computer can read. More particularly, in the memory section 130, for example, such contents as an image data file 131, a reading program 136, a memory program 137, an image forming program 138 are stored as shown in FIG. 2.

Figure 3:
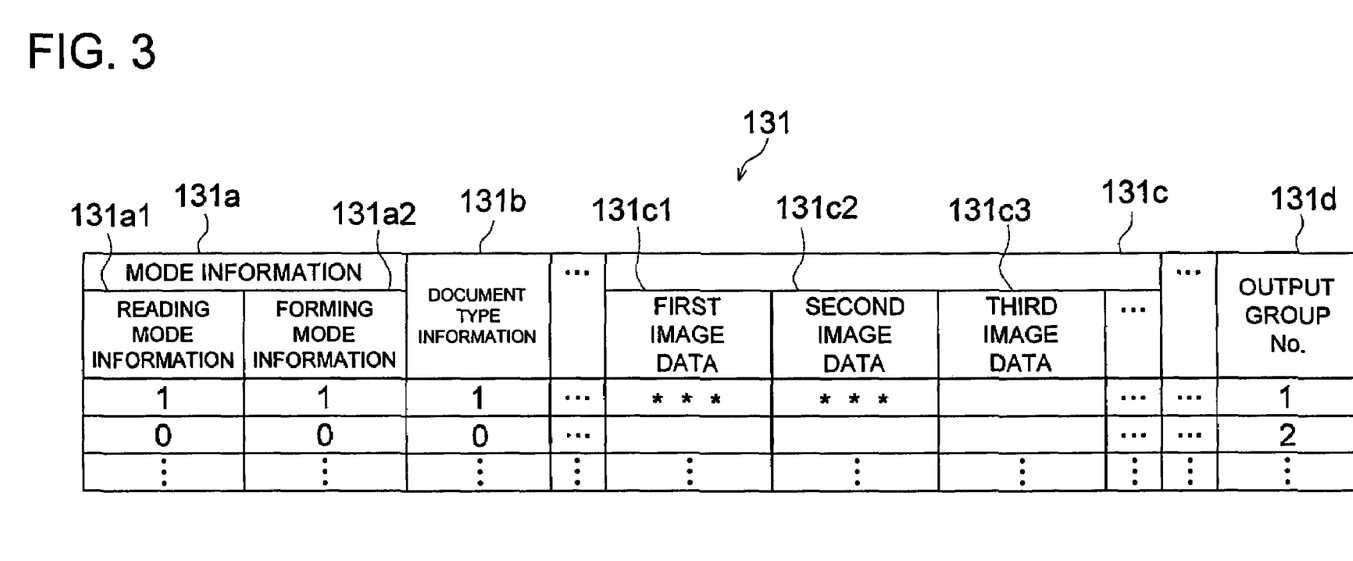
FIG. 3 is a view showing the data structure of an image data file shown in FIG. 2.

The image data file 131 is a memory section and stores image data read by the scanner 11 that is the reading section. More particularly, the image data file 131 has such regions, for example, as a "mode information" memory region 131a, a "document type information" memory region 131b, an "image data" memory region 131c, and an "output group number" memory region 131d as shown in FIG. 3.

The "mode information" memory region 131a has such regions, for example, as a "reading mode information" memory region 131a1 and a "forming mode information" memory region 131a2.

The "reading mode information" memory region 131a1 stores the reading mode information which is the information involving whether to read or not image data from both sides of the document in the document bundle. In this embodiment, in the "reading mode information" memory region 131a1, "0" is previously stored, and when a user instructs to read the image data from both sides of the document via a touch panel 220 which is the instruction section, "1" is stored therein. In other words, when "0" is stored in the "reading mode information" memory region 131a1, the control section 100 causes the scanner 11 to read the image data from one side of the document. On the other hand, when "1" is stored in the "reading mode information" memory region 131a1, the control section 100, as the reading control section, causes the scanner 11 to read the image data from both sides of the document.

The "forming mode information" memory region 131a2 stores the forming mode information which is the information involving whether to form or not images based on the image data on both sides of the sheet P. In this embodiment, in the "forming mode information" memory region 131a2, "0" is previously stored, and when the user instructs to form the images based on the image data on both sides of the sheet P via the touch panel 220, "1" is stored therein. In other words, when "0" is stored in the "forming mode information" memory region 131a2, the control section 100 causes the image forming output section 400 to form the image on only one side of the sheet P. On the other hand, when "1" is stored, the control section 100 causes the image forming output section 400 to form the images on both sides of the sheet P.

Incidentally, the reading mode information and the forming mode information are designed to be correlated with each other and stored in the image data file 131.

The "document type information" memory region 131b stores the document type information which is the information involving whether the first document in the document bundle is a document with tab or not. The document type information is used as identification information which identifies the document bundle includes a document with tab as a first document. In this embodiment, in the "document type information" memory region 131b, "0" is previously stored, and when the user designates to read the first document in the document bundle as the document with tab via the touch panel 220 which is the designation section, "1" as the identification information is stored therein. In other words, when "0" is stored in the "document type information" memory region 131b, the control section 100 causes the scanner 11 to read image data in accordance with the information stored in the "reading mode information" memory region 131a1, and causes the image forming output section 400 to form an image in accordance with the information stored in the "forming mode information" memory region 131a2. On the other hand, when "1" is stored in the "document type information" memory region 131b, the control section 100, as the reading control section, causes the scanner 11 to read image data in the whole document area including a tab portion from one side of the first document in the document bundle, and then causes the scanner 11 to read image data from the other documents in the document bundle in accordance with the information stored in the "reading mode information" memory region 131a1. In other words, the document with tab in most of the cases has an image at only one side. Thus, the control section 100 carries out one-side reading for the first sheet of the document with tab regardless of the "reading mode information". With this feature, productivity may be improved. Further, the control section 100, as the image forming control section, causes the image forming output section 400 to form an image based on the image data of one side of the first document in the document bundle on one side of the first sheet Pa (sheet with a tab), and then to form images based on the image data of the other documents in the document bundle on the second sheets Pb (normal sheets) in accordance with the information stored in the "forming mode information" memory region 131a2.

Incidentally, "1" as the identification information is designed to be stored in the "document type information" memory region 131b by the control section 100 which is the memory control section in accordance with the designation from the user via the touch panel 220 which is the designation section.

The "image data" memory region 131$c$ is divided, for example, into a "first image data" memory region 131$c$1, a "second image data" memory region 131$c$2, a "third image data" memory region 131$c$3 and so on, so as to be able to store image data by each document bundle. The "first image data" memory region 131$c$1 stores image data the scanner 11 has read from a first document bundle. The "second image data" memory region 131$c$2 stores image data the scanner 11 has read from a second document bundle. The "third image data" memory region 131$c$3 stores image data the scanner 11 has read from a third document bundle.

In other words, the first image data corresponds to the first document bundle, the second image data corresponds to the second document bundle, and the third image data corresponds to the third document bundle. Each image data has the common reading mode information, forming mode information and document type information respectively.

The "output group number" memory region 131$d$ stores the output group number for identifying the correlation of the mode information and the document type information stored in the "document type information" memory region 131$b$ with the image data stored in the "image data" memory region 131$c$. The mode information includes the reading mode information and the forming mode information that are stored in the "mode information" memory region 131$a$, In other words, the first, second, and third image data can be respectively controlled by the output group number as one group.

The image data read by the scanner 11 from each of the document bundles are designed to be sequentially stored in the "image data" memory region 131$a$ of the same output group number until when the output of the image based on the image data is instructed from the operation section 200 by the user.

When the image output is instructed from the operation of the operation section 200 by the user, the images based on each of the image data of the same output group number will be output collectively in accordance with the corresponding reading mode information, forming mode information and document type information.

The reading program 136 causes the CPU 110 to provide control, when designated to read the first document in the document bundle as the document with tab by the user via the touch panel 220 which is the designation section, to cause the scanner 11 which is the reading section to read image data in the whole area including the tab portion from the first document in the document bundle conveyed from the scanner cover 12 which is the automatic document conveyance section.

Further, the reading program 136 causes the CPU 110 to control the scanner 11 to read image data from one side of the first document in the document bundle and from both sides of the other documents in the document bundle, when instructed to read image data from both sides of the document in the document bundle by the user via the touch panel 220 which is the instruction section, in addition to the designation from the user via the touch panel 220 which is the designation section.

More particularly, when "1" as the identification information is stored in the "document type information" memory region 131$b$ of the image data file 131 in accordance with the instruction by the user via the touch panel 220, the CPU 110 executes the reading program 136 and causes, for example, the scanner 11 to read image data in the whole document area including the tab portion from the first document in the document bundle conveyed from the scanner cover 12. And then CPU 110 causes the scanner 11 to read image data from the documents other than the first document in the document bundle conveyed from the scanner cover 12.

In the case where "1" as the identification information is stored in the "document type information" memory region 131$b$ of the image data file 131 and further "1" is stored in the "reading mode information" memory region 131$a$1 of the image data file 131 in accordance with the instruction by the user via the touch panel 220, the CPU 110 executes the reading program 136 and causes, for example, the scanner 11 to read image data in the whole document area including the tab portion from one side of the first document in the document bundle conveyed from the scanner cover 12. And then CPU 110 causes the scanner 11 to read image data from both sides of the documents other than the first document in the document bundle conveyed from the scanner cover 12.

The control section 100, as the reading control section, carries out the above processing by the CPU 110 executing the reading program 136.

The memory program 137 causes the CPU 110 to provide control that causes the image data file 131 which is the memory section to store image data in the whole document area including the tab portion of the first document in the document bundle read by the scanner 11 which is the reading section together with the identifiable identification information.

More particularly, when designated to read the first document in the document bundle as the document with tab by the user via the touch panel 220 which is the designation section, the CPU 110 executes the memory program 137 to cause the "document type information" memory region 131$b$ of the image data file 131 to store "1". With this feature, the document bundle may be identified whether including the first document is a document with tab or not.

The control section 100 carries out the above processing as the memory control section by the CPU 110 executing the memory program 137.

When designated to read the first document in the document bundle as the document with tab by the user via the touch panel 220 which is the designation section, the image forming program 138 causes the CPU 110 to provide control to cause the image forming output section 400 which is the image forming section to form an image based on the image data of the first document in the document bundle read by the scanner 11 which is the reading section on the first sheet Pa accommodated in the first sheet feeding tray 61$a$. And the image forming program 138 causes the CPU 110 to provide control to form images based on the image data of the other documents in the document bundle on the second sheets Pb accommodated in the second sheet feeding tray 61$b$.

Further, the image forming program 138 causes the CPU 110 to provide control, in addition to the designation by the user via the touch panel 220 which is the designation section, when instructed to read image data from both sides of the documents in the document bundle by the user via the touch panel 220 which is the instruction section, to cause the image forming output section 400 to form an image based on the image data of one side of the first document in the document bundle on one side of the first sheet Pa accommodated in the first sheet feeding tray 61$a$, as well as to form images based on the image data of both sides of the other documents in the document bundle on one side or both sides of the second sheets Pb accommodated in the second sheet feeding tray 61$b$.

More particularly, when "1" as the identification information is stored in the "document type information" memory region 131$b$ of the image data file 131 in accordance with the designation from the user via the touch panel 220, the CPU 110 executes the image forming program 138 and causes, for example, the image forming output section 400 to form an image based on the image data of the first document in the document bundle read by the scanner 11 on the first sheet Pa (sheet with a tab) accommodated in the first sheet feeding tray 61a, and then causes the image forming output section 400 to form images based on the image data of the documents other than the first document in the document bundle on the second sheets Pb (sheets without tab) accommodated in the second sheet feeding tray 61b.

In the case where "1" as the identification information is stored in the "document type information" memory region 131b of the image data file 131 and "1" is further stored in the "forming mode information" memory region 131a2 of the image data file 131 in accordance with the designation from the user via the touch panel 220, the CPU 110 executes the image forming program 138 and causes, for example, the image forming output section 400 to form an image based on the image data of one side of the first document in the document bundle read by the scanner 11 on one side of the first sheet Pa (sheet with a tab), and then causes the image forming output section 400 to form images based on the image data of both sides of the documents other than the first document in the document bundle on both sides of the second sheets Pb (sheets without tab).

The control section 100 carries out the above processing as the image forming control section by the CPU 110 executing the image forming program 138.

Figure 4:
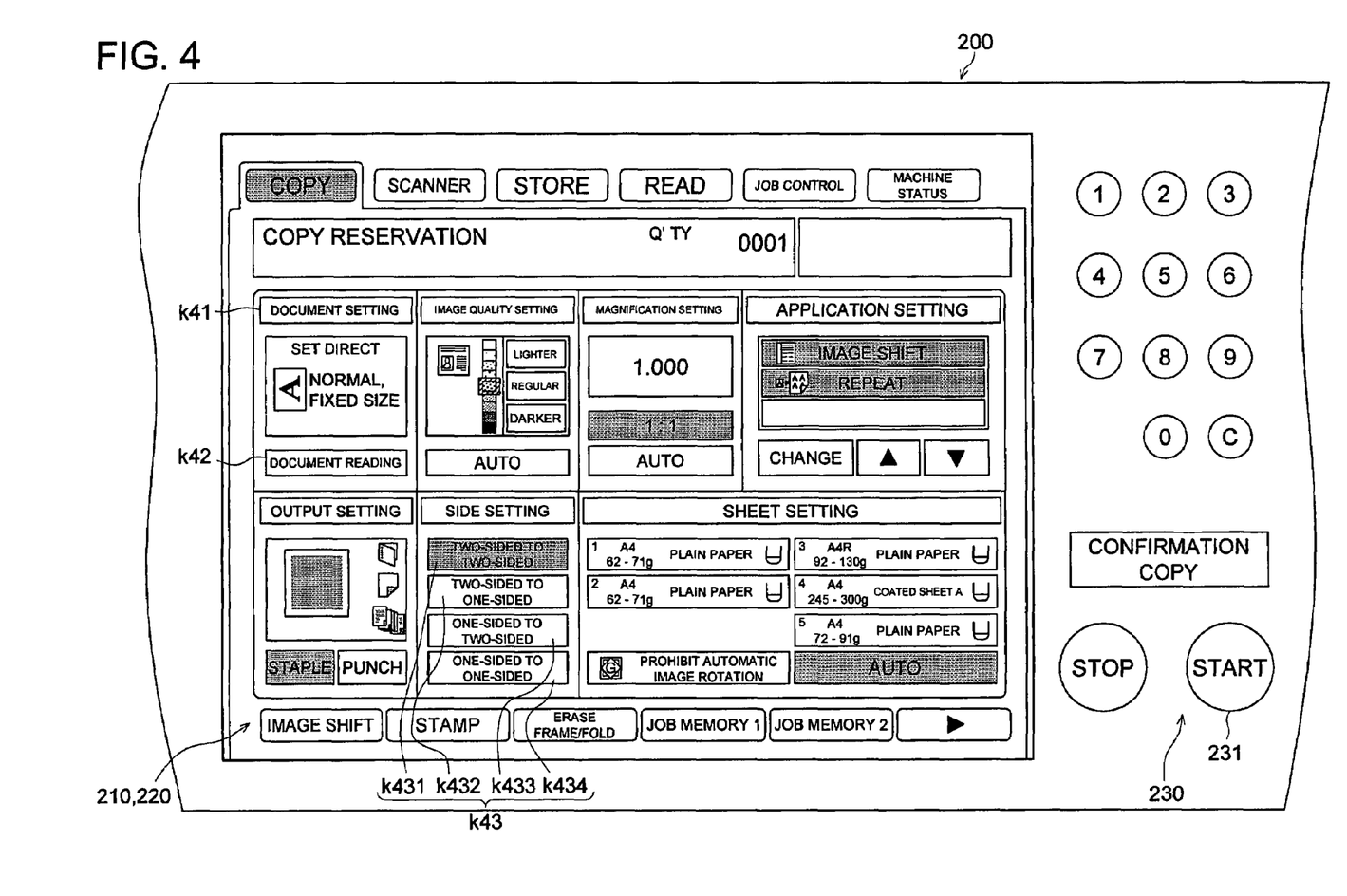
FIG. 4 is a plane view of an operation section shown in FIG. 2, which is a view showing a main menu screen.

The operation section 200 is constituted, for example, by a liquid crystal display section 210, the touch panel 220, various input buttons 230 and the like as shown in FIG. 2 and FIG. 4.

The liquid crystal display section 210 carries out a predetermined display processing in accordance with the display signal that is input from the control section 100. The liquid crystal display section 210 in this embodiment is used, for example, when the control section 100 displays a screen for setting whether a document with tab is included in the documents in the document bundle or not (specifically, a document setting screen (for example, FIG. 6)).

The touch panel 220, which is mounted over the top surface of the liquid crystal display section 210, detects a desired input position which is pushed down and input from the operation using a finger of the user and the like, and outputs the detection signal to the control section 100. The touch panel 220 in this embodiment is the designation section and used, for example, when the user designates to read the first document in the document bundle as the document with tab. Further, the touch panel 220 in this embodiment is the instruction section and used, for example, when the user instructs to read image data from both sides of the documents in the document bundle.

The various input buttons 230 output a push-down signal in association with the button operation of the user to the control section 100. The various input buttons 230 specifically include, for example, a "start" button 231 and other buttons as shown in FIG. 4. The various input buttons 230 may be used, for example, when the user instructs to output an image based on the image data to the control section 100.

The image processing section 300 carries out, for example, a predetermined image processing relative to the image data read by the scanner 11 which is the reading section and being stored in the image data file 131 which is the memory section.

The image forming output section 400, which is the image forming section, forms and outputs, for example, an image based on the image data stored in the image data file 131 which is the memory section in accordance with the instruction from the control section 100 on the sheet P. Further by the control of the control section 100 which is the image forming control section, the image forming output section 400 forms, for example, an image based on the image data of one side of the first document in the document bundle on one side of the first sheet Pa (sheet with tab), as well as forms images based on the image data of both sides of the other documents in the document bundle on one side or both sides of the second sheets Pb (sheets without tab).

The image forming output section 400 specifically has, for example, the image forming section 40, the intermediate transfer belt 50, the sheet feeding section 60, the fixing section 70 and other related components that are provided inside the image forming apparatus main body 20.

(Processing in the Image Forming Apparatus)

Figure 5:
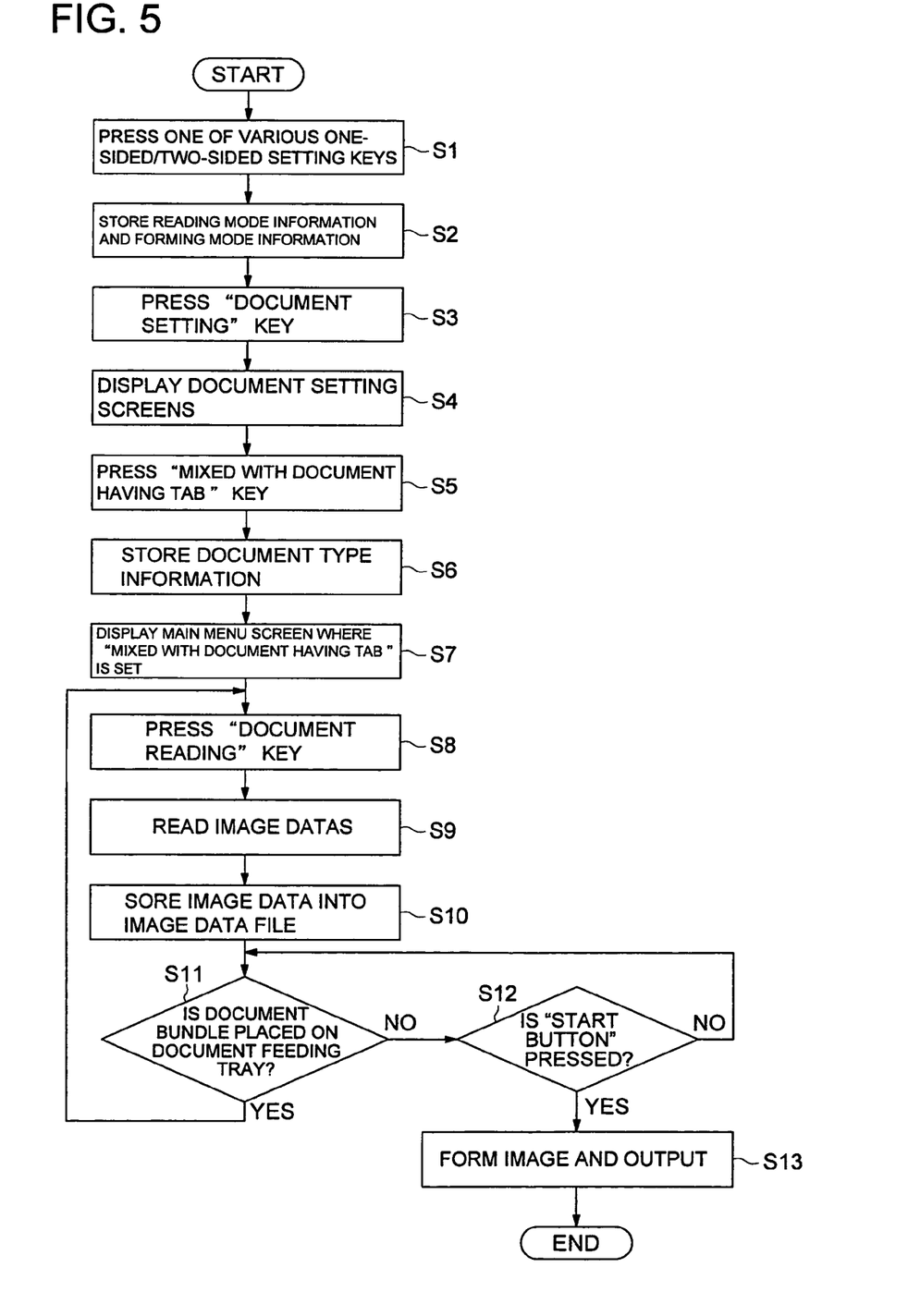
FIG. 5 is a flowchart for illustrating the processing involving forming of images.

Next, the processing involving forming and outputting images in the image forming apparatus 1 will be described with reference to FIG. 5.

When the power of the image forming apparatus 1 is turned on by the user, the control section 100 causes the liquid crystal display section 210 of the operation section 200 to display, for example, a main menu screen as shown in FIG. 4.

More specifically, displayed in the main menu screen are images, for example, such as a "document setting" key k41, a "document reading" key k42, various one-sided/two-sided setting keys k43 (specifically such as a "two-sided to two-sided" key k431 and a "two-sided to one-sided" key k432, a "one-sided to two-sided" key k433, a "one-sided to one-sided" key k434) that are keys the user uses in the issue of instructions to the control section 100.

Next, either of the various one-sided/two-sided setting keys k43 of the main menu screen is pushed down from the push-down operation to the touch panel 220 by the user (Step S1).

More particularly, it is assumed that the user pushes down the "two-sided to two-sided" key k431 when desiring to cause the image data to be read from both sides of the document in the document bundle and to cause the images based on the image data to be formed and output on both sides of the sheet P.

Further, it is assumed that the user pushes down the "two-sided to one-sided" key k432 when desiring to cause the image data to be read from both sides of the document in the document bundle and to cause the image based on the image data to be formed and output on one side of the sheet P.

Further, it is assumed that the user pushes down the "one-sided to two-sided" key k433 when desiring to cause the image data to be read from one side of the document in the document bundle and to cause the image based on the image data to be formed and output on both sides of the sheet P.

Still further, it is assumed that the user pushes down the "one-sided to one-sided" key k434 when desiring to cause the image data to be read from one side of the document in the document bundle and to cause the image based on the image data to be formed and output on one side of the sheet P.

Herein, more particularly, it is assumed that the user pushes down, for example, the "two-sided to two-sided" key k431 in Step S1.

Next, the control section 100 causes the image data file 131 to store the reading mode information and forming mode information that respectively correspond to either of the various one-sided/two-sided keys k43 pushed down in Step S1 (Step S2).

More particularly, when the "two-sided to two-sided" key k431 or the "two-sided to one-sided" key k432 is pushed down in Step S1, the control section 100 causes the "reading mode information" memory region 131a1 of the image data file 131 to store "1".

When the "two-sided to two-sided" key k431 or the "one-sided to two-sided" key k433 is pushed down in Step S1, the control section 100 causes the "forming mode information" memory region 131a2 of the image data file 131 to store "1".

Herein, more particularly, for example, when the "two-sided to two sided" key k431 is pushed down in Step S1, the control section 100 causes the "reading mode information" memory region 131a1 and the "forming mode information" memory region 131a2 to store "1" in Step S2. Incidentally, it is assumed herein that "1" is stored in the "reading mode information" memory region 131a1 and "forming mode information" memory region 131a2 that respectively correspond to the output group number "1" (see FIG. 3).

Figure 6:
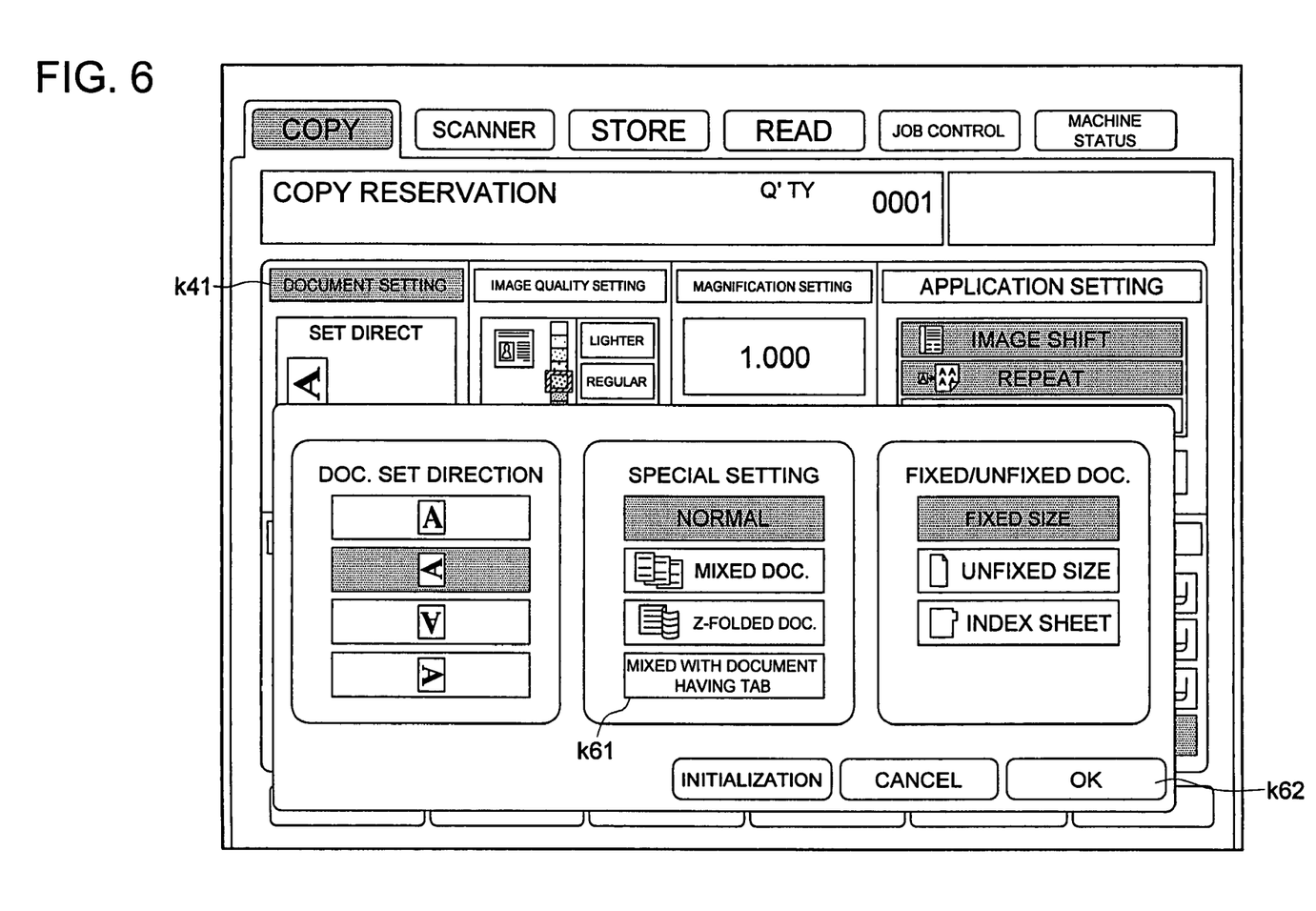
FIG. 6 is a view showing a document setting screen.

Next, when the "document setting" key k41 of the main menu screen is pushed down by the user (Step S3), the control section 100 causes the liquid crystal display section 210 to display, for example, a document setting screen as shown in FIG. 6 (Step S4).

More particularly, for example, displayed in the document setting screen are images such as a "mixed with document having tab" key k61 and an "OK" key k62.

Next, when the "mixed with document having tab" key k61 is pushed down by the user (Step S5), the control section 100 causes the image data file 131 to store the document type information corresponding to the "mixed with document having tab" key k61 (Step S6).

More particularly, when the "mixed with document having tab" key k61 and then the "OK" key k62 are pushed down by the user, the control section 100 causes the "document type information" memory region 131b of the image data file 131 to store "1" as the identification information. Incidentally, the document type information is correlated with the reading mode information and forming mode information that are stored in Step S2 and is stored in the image data file 131.

Herein, more particularly, the control section 100 causes, for example in Step S6, the "document type information" memory region 131b in which the output group numbers of the reading mode information and forming mode information stored in Step S2 are identical to each other, namely, the "document type information" memory region 131b corresponding to the output group number "1", to store "1" (see FIG. 3).

Figure 7:
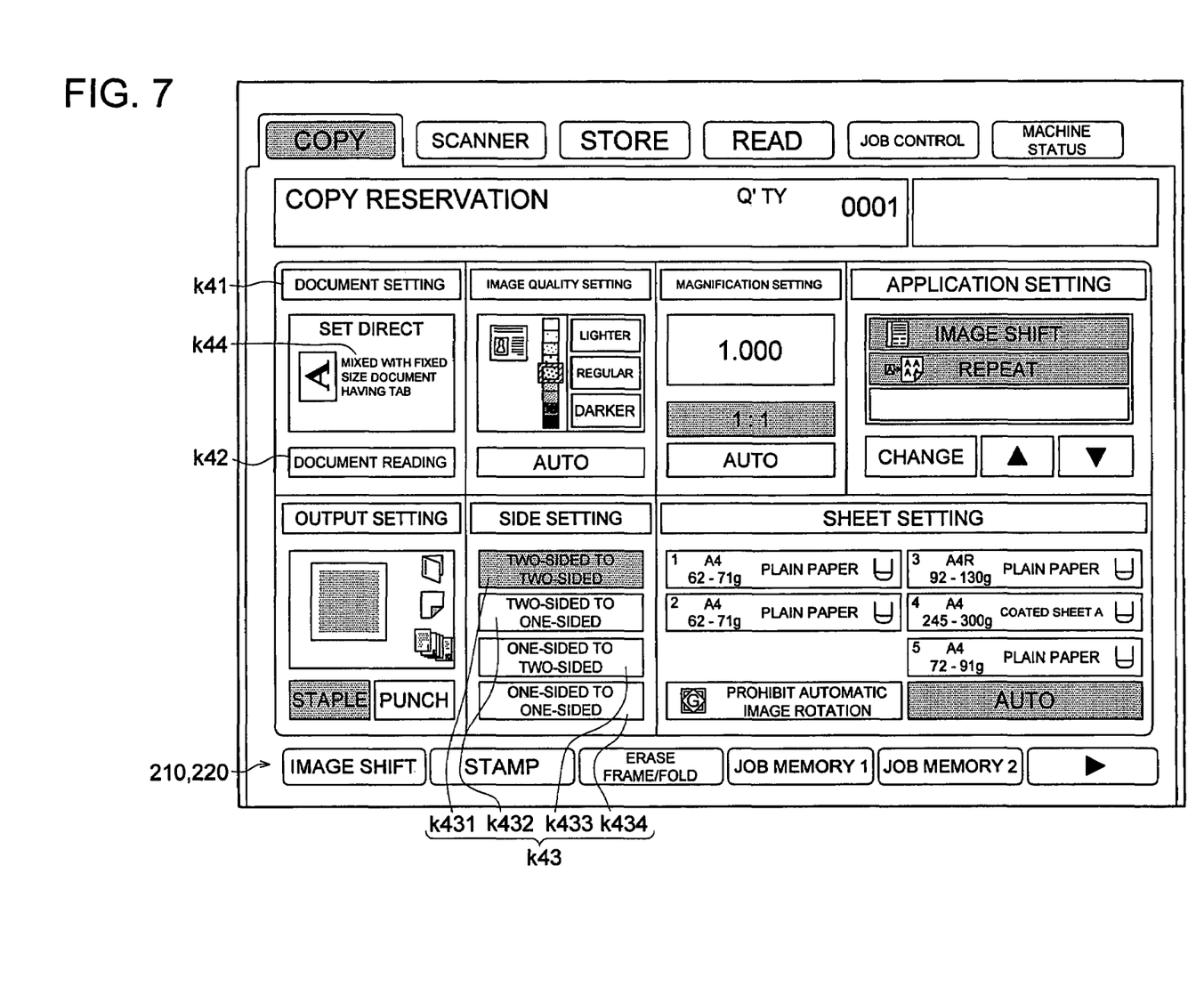
FIG. 7 is a view showing the main menu screen with "mixed with document having tab" set therein.

Next, the control section 100 causes the liquid crystal display section 210 to display the main menu screen with the "mixed with document having tab" is set therein, for example, as shown in FIG. 7 (Step S7).

More particularly, displayed in the main menu screen with the "mixed with document having tab" set therein are images, for example as shown in FIG. 4, such as the "document reading" key k42, various one-sided/two-sided setting keys k43 similar to the main menu. Between the "document setting" key k41 and the "document reading" key k42, a display k44 indicating that the "mixed with document having tab" has been set is displayed in the main screen.

Next, a document bundle is placed on the document feeding tray 12a of the scanner cover 12 and the "document reading" key k42 of the main menu screen with the "mixed with document having tab" set therein (FIG. 7) is pushed down by the user (Step S8).

Incidentally, it is assumed that the user places, for example, one document bundle of a plurality of document bundles sorted so that the first document of each of the document bundles is the document with tab on the document feeding tray 12a.

The control section 100 causes the scanner 11 and scanner cover 12 of the image reading section 10 to read image data from the documents in the document bundle placed on the document feeding tray 12a in accordance with the reading mode information stored in the "reading mode information" memory region 131a1 of the image data file 131 and the document type information stored in the "document type information" memory region 131a2 of the image data file 131 (Step S9).

More particularly, when instructed to read the image data from the control section 100, the scanner cover 12 as the automatic document conveyance section conveys a document in the document bundle placed on the document feeding tray 12a to the document reading position. The scanner 11 as the reading section reads the image data from the document conveyed at the document reading position. When the image data reading from the document by the scanner 11 is completed, the scanner cover 12 conveys the document set at the document reading position out to the document delivery tray 12b and conveys again another document in the document bundle placed on the document feeding tray 12a to the document reading position. The scanner 11 and the scanner cover 12 repeat a series of such operations until there is no more document in the document bundle placed on the document feeding tray 12a. Incidentally, the image data read by the scanner 11 is output to the control section 100 and temporarily stored in the RAM 120.

In the case where "mixed with document having tab" is set in S5 and "two-sided to one-sided", "two-sided to two-sided" are set in S1, this is though the designation of two-sided reading, one-sided reading is carried out for the document with tab which is the first document in the document bundle in Step S9. With this feature, the image reading processing of the first document with tab may be effectively carried out.

In the case where "mixed with document having tab" is set in S5 and "one-sided to two-sided", "two-sided to two-sided" are set in S1, this is though the designation of two-sided image forming, one-sided image forming is carried out for the document with tab which is the first document in the document bundle in Step S13. With this feature, the image forming processing of the first document with tab may be effectively carried out.

Incidentally, an example of carrying out the image forming by the push-down of the "start" button after reading the image data is shown herein, however, it may also be possible to carry out the image forming by designating and calling up again the output group number through the screen and the like after once the processing is completed.

Further, in the case where a plurality of sheet feeding trays exist, it may be configured to accordingly select the first sheet feeding tray or the second sheet feeding tray to feed the sheet using the size information of the document to be read. The document size information may be obtained by providing a sensor in the document conveyance section or in the reading section, or carrying out the document size input and the like.

Next, the control section 100 causes the image data file 131 to store the image data that are read from all of the documents of the document bundle placed in the document feeding tray 12a and stored in the RAM 120 (Step S10).

More particularly, the control section 100 causes the "image data" memory region 131c of the image data file 131 to store the image data. Incidentally, the image data is correlated with the reading mode information and forming mode information that are stored in Step S2 and the document type information stored in Step S6 and stored in the image data file 131.

Next, the control section 100 judges whether the document bundle is placed again on the document feeding tray 12a of the scanner cover 12 by the user (Step S11).

When judging that the document bundle is placed on the document feeding tray 12a in Step S11 (Step S11; Yes), the control section 100 repeatedly carries out the further processing from Step S8.

Incidentally, when repeatedly carrying out the further processing from Step S8, it is assumed that the control section 100 recognizes, for example, the document bundle from which the image data is read in Step S9 in the first time as a first document bundle, and the document bundle from which the image data is read in Step S9 in the second time as a second document bundle. In other words, every time the further processing from the Step 8 is repeated, it is assumed that the control section 100 recognizes the image data read in Step S9 sequentially as the image data read from the first document bundle, the image data read from the second document bundle and so on.

Further, in Step S10 in the first time, the control section 100 causes a "first image data" memory region 131c1 of the "image data" memory region 131c to store the image data read from the first document bundle in Step S9 in the first time. Then in Step S10 in the second time, the control section 100 causes a "second image data" memory region 131c2 of the "image data" memory region 131c to store the image data read from the second document bundle in Step S9 in the second time, correlating with the image data caused to be stored in Step S10 in the first time. In other words, every time the further processing from Step S8 is repeated, it is assumed that, in Step S10, the control section 100 sequentially causes the "first image data" memory region 131c1, the "second image data" memory region 131c2 and so on of the same output group number to store the image data read in Step S9.

Figure 8A:
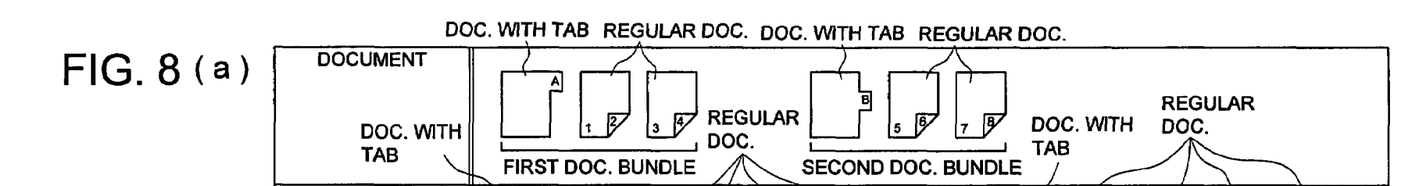
FIG. 8a-8c are views for illustrating the processing involving reading image data (FIG. 8b) from documents in a document bundle including a document with tab (FIG. 8a) and forming images based on the image data (FIG. 8c).
Figure 8B:
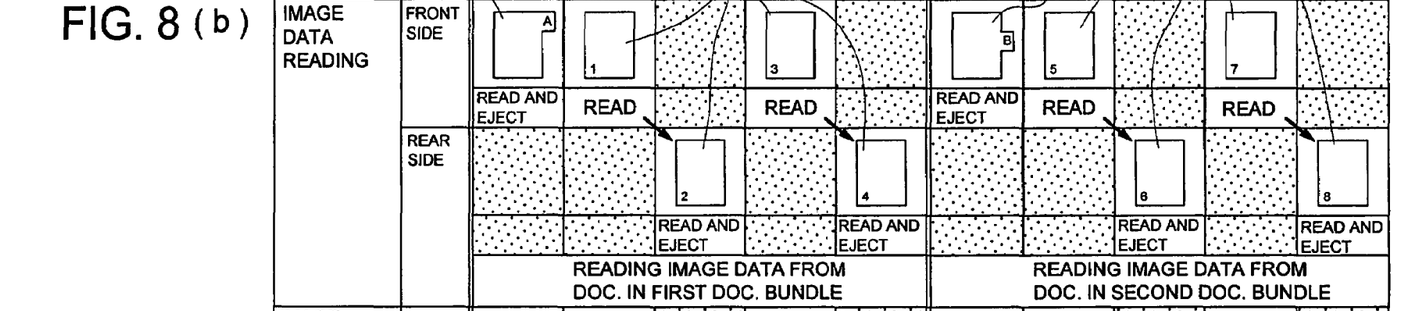

Herein more particularly, for example, when the control section 100 instructs the scanner 11 and scanner cover 12 of the image reading section 10 to read image data from the documents (the document with tab and with the document number "A", the normal document with document numbers "1" in the front face and "2" in the rear face, and the normal document with the document numbers "3" in the front face and "4" in the rear face) in the first document bundle shown in FIG. 8a which is placed in the document feeding tray 12a in accordance with "1" that is stored in the "reading mode information" memory region 131a1 corresponding to the output group number "1" of the image data file 131 (FIG. 3) (namely, the information for reading image data from both sides of the document) and "1" that is stored in the "document type information" memory region 131a2 (namely, the information for reading the first document in the document bundle as the document with tab), the scanner 11 and the scanner cover 12 read image data from the documents in the first document bundle as shown in FIG. 8(b). Further, in Step S9 in the second time, the control section 100 instructs the scanner 11 and scanner cover 12 of the image reading section 10 to read image data from the documents in the second document bundle on the document feeding tray 12a placed by the user in Step S11 in the first time as shown in FIG. 8(a) (namely, the document with tab and the document number "B", the normal document with the document numbers "5" in the front face and "6" in the rear face, the normal document with the document numbers "7" in the front face and "8" in the rear face) in accordance with "1" that is stored in the "reading mode information" memory region 131a1 corresponding to the output group number "1" of the image data file 131 and "1" that is stored in the "document type information" memory region 131a2, the scanner 11 and the scanner cover 12 read image data from the documents in the second document bundle as shown in FIG. 8(b).

Further, in Step S10 in the first time, the control section 100 causes the "first image data" memory region 131c1 in which the output group numbers of the reading mode information and forming mode information stored in Step S2 and the document type information stored in Step S6 are identical to each other, namely, the "first image data" memory region 131c1 corresponding to the output group number "1", to store the image data of the documents in the first document bundle. Further, in Step S10 in the second time, the control section 100 causes the "second image data" memory region 131c2 corresponding to the output group number "1" to store the image data of the documents in the second document bundle.

On the other hand, when judging that any document bundle is not placed on the document feeding tray 12a in Step S11 (Step S11; No), the control section 100 judges whether the "start" button 231 of the various input buttons 230 is pushed down from the button operation by the user (Step S12).

When judging that the "start" button 231 is not pushed down in Step S12 (Step S12; No), the control section 100 repeatedly carries out the processing of Step S11.

On the other hand, when judging that the "start" button 231 is pushed down in Step S12 (Step S12; Yes), the control section 100 causes the image forming output section 400 to form and output images based on the image data stored in Step S10 on the sheets P accommodated in the sheet feeding tray 61 in accordance with the forming mode information stored in the "forming mode information" memory region 131a2 of the image data file 131 and the document type information stored in the "document type information" memory region 131b of the image data file 131 (Step S13), and the control section 100 completes the processing.

Figure 8C:
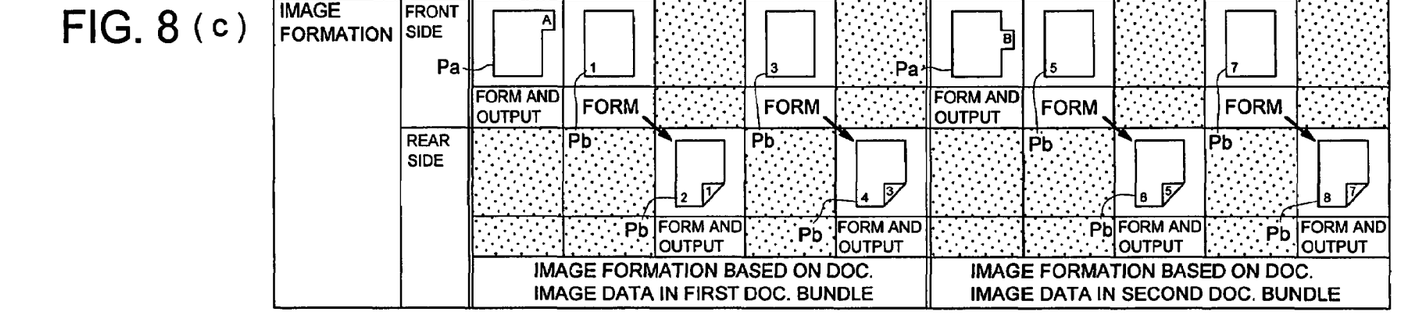

Herein more particularly, for example in Step S13, when the control section 100 instructs the image forming output section 400 to form and output images based on the image data corresponding to the output group number "1" in accordance with "1" that is stored in the "forming mode information" memory region 131a2 corresponding to the output group number "1" of the image data file 131 (FIG. 3) (namely, the information for forming images based on the image data on both sides of the sheet P) and "1" that is stored in the "document type information" memory region 131b (namely, the information for reading the first document in the document bundle as the document with tab), the image forming output section 400 causes the images based on the image data of the documents in the first document bundle and the second document bundle to be formed and output in batch on the first sheets Pa (sheets with tab) and the second sheets Pb (normal sheets) as shown in FIG. 8c.

With the image forming apparatus 1 of the present embodiment as described above, in the case where the user designates to read the first document in the document bundle as the document with tab via the touch panel 220 which is the designation section and further instructs to read image data from both sides of the documents in the document bundle via the touch panel 220 which is the designation section, it is possible to control by the control section 100 which is the reading control section to cause the scanner 11 which is the reading section to read image data in the whole document area including the tab portion from one side of the first document in the document bundle conveyed from the scanner cover 12 which is the automatic document conveyance section as well as to read image data from both sides of the other documents in the document bundle. And it is possible to control by the control section 100 which is the image forming control section to cause the image forming output section 400 which is the image forming section to form an image based on the image data of one side of the first document in the document bundle on one side of the first sheet Pa accommodated in the first sheet feeding tray 61*a* as well as to form images based on the image data of both sides of the other documents in the document bundle on one side or both sides of the second sheets Pb accommodated in the second sheet feeding tray 61*b*.

In other words, when designated that the document bundle includes the document with tab, the control section 100 can cause the image based on the image data of the first document in the document bundle to be formed on the first sheet Pa (sheet with tab) only by sorting the document bundles and causing the scanner 11 to read the image data, and can also cause the images based on the image data of the documents other than the first document in the document bundle to be formed on the second sheets Pb (normal sheets). Further, when designated that the document bundle includes the document with tab, the scanner 11 reads the image data only from one side of the document with tab even when instructed to read the image data from both sides of the documents in the document bundle, and the image forming output section 400 forms and outputs the image based on the image data on only one side of the first sheet Pa (sheet with tab).

Thus, it is not necessary to be equipped with a sensor for determining the document with tab and the normal document which does not have tab to cause the document with tab and the normal document to be read separately. Further, waste reading and forming operations can be omitted, so that it is possible to read the image data from the document bundle including the document with tab as well as to form and output images from the image data more inexpensively and more effectively.

Further, in the case where the user designates to read the first document in the document bundle as the document with tab via the touch panel 220, it is possible to control by the control section 100 which is the memory control section to cause the image data file 131 which is the memory section to store the image data in the whole document area including the tab portion of the first document in the document bundle together with the document type information "1" as the identifiable identification information, namely, the information for reading the first document in the document bundle as the document with tab.

In other words, for example, even when a plurality of image data are stored in the image data file 131, the image data of the document with tab can be identified by the document type information "1". Thus, for example, when a plurality of document bundles including the documents with tab exist and the image data are read from all of the document bundles and stored, subsequently it will be possible to cause the image based on the image data of the first document in each of the document bundles to be formed on the first sheet Pa (sheet with tab) as well as to cause the images based on the image data of the documents other than the first document in each of the document bundles to be formed on the second sheets Pb (normal sheets).

It is to be noted that the present invention is not construed as limited to the embodiment described above.

For example, the user instructs to read image data from both sides of the documents in the document bundle via the touch panel 220 which is the designation section, but the user may instruct to read the image data from one side of the documents in the document bundle. In this case, the control section 100 which is the reading control section provides control to cause the scanner 11 to read image data in the whole document area including the tab portion from one side of the first document in the document bundle conveyed from the scanner cover 12 as well as to read image data from one side of the other documents in the document bundle, and the control section 100 which is the image forming section provides control to cause the image forming output section 400 which is the image forming section to form an image based on the image data of one side of the first document in the document bundle on one side of the first sheet Pa (sheet with tab) accommodated in the first sheet feeding tray 61*a* as well as to from images based on the image data of one side of the other documents in the document bundle on one side of the second sheets Pb (sheets without tab) accommodated in the second sheet feeding tray 61*b*.

In the embodiment as described above, it is designed to cause the image data in the whole document area including the tab portion of the first document in the document bundle read by the scanner 11 to be stored together with the document type information "1" as the identifiable identification information, namely, the information for reading the first document in the document bundle as the document with tab, but the present invention is not limited to this. For example, in the case where the image data can be identified that it is in the whole document area including the tab portion, more particularly, in the case where the image data is read and stored as well as the image based on the image data is formed and output immediately after the designation made by the user to read the first document in the document bundle as the document with tab via the touch panel 220 which is the designation section, it may be also designed to cause the image data file 131 to store only the image data, without causing the image file 131 to store the image data in the whole document area including the tab portion together with the document type information "1".

What is claimed is:

1. An image forming apparatus comprising:
    (a) a document conveyance section for conveying a document of a document bundle to a document reading position;
    (b) a reading section for reading the document in the document bundle conveyed by the document conveyance section to obtain an image of the document;
    (c) a designation section for designating to read a first document of the document bundle as a document with a tab;
    (d) a reading control section for controlling the reading section to read the image of the first document in the document bundle for a document area including a tab portion, and to read an image of a document other than the first document in the document bundle, for a document area excluding the tab portion, when the first document in the document bundle is designated by the designation section; and
    (e) an image forming section for forming an image based on the image onto a sheet.

2. The image forming apparatus of claim 1, further comprising a memory section for storing the image obtained by the reading section.

3. The image forming apparatus of claim 2, further comprising a memory control section for storing the image of the document area including the tab portion of the first document, together with identification information for identifying the image of the area including the tab, onto the memory section.

4. The image forming apparatus of claim 3, further comprising an image formation control section for controlling the image forming section to form the image based on the image of the first document in the document bundle which has been read by the reading section, onto a first type of sheet accommodated in a first sheet feeding tray, and to form the image based on an image of the document other than the first document of the document bundle, onto a second type of sheet accommodated in a second sheet feeding tray.

5. The image forming apparatus of claim 4, wherein the image formation control section controls the image formation section to form an image based on the image of the one side of the first document of the document bundle on the basis of the identification information, onto one side of the first type of sheet.

6. The image forming apparatus of claim 4, wherein the first type of sheet is a sheet with the tab.

7. The image forming apparatus of claim 3, wherein the identification information is stored in accordance with each document.

8. The image forming apparatus of claim 1, further comprising an image formation control section for controlling the image forming section to form the image based on the image of the first document of the document bundle which has been read by the reading section, onto a first type of sheet accommodated in a first sheet feeding tray, and to form the image based on an image of the document other than the first document in the document bundle, onto a second type of sheet accommodated in a second sheet feeding tray.

9. The image forming apparatus of claim 8, wherein the first type of sheet is a sheet with the tab.

10. The image forming apparatus of claim 1, further comprising an instruction section for instructing to read an image from both sides of a document in the document bundle,
wherein when the reading control section is instructed to read the image from both sides of the document, the reading control section controls the reading section to read one side of the first document of the document bundle and to read both sides of the document other than the first document.

11. The image forming apparatus of claim 10, further comprising an image formation control section for controlling the image forming section to form the image based on the image in the first document of the document bundle which has been read by the reading section, onto a first type of sheet accommodated in a first sheet feeding tray, and to form the image based on an image of a document other than the first document of the document bundle, onto a second type of sheet accommodated in a second sheet feeding tray.

12. The image forming apparatus of claim 11, wherein the image formation control section controls the image forming section to form the image based on an image of one side of the first document in the document bundle which has been read by the reading section, onto one side of the first type of sheet, and to form the image based on an image of both sides of the document other than the first document of the document bundle, onto one side or both sides of the second type of sheet.

13. The image forming apparatus of claim 11,
wherein the image formation control section comprises an instruction section for instructing to form images on both sides of a sheet on the basis of the image data of the document of the document bundle, and
wherein the image formation control section controls the image formation section to form an image based on the image of one side of the first document in the document bundle onto one side of the first type of sheet on the basis of the identification information, irrespective of the designation which has been designated in the instruction section.

14. The image forming apparatus of claim 11, wherein the first type of sheet is a sheet with the tab.

15. An image forming method comprising the steps of:
(a) designating to read a first document in a document bundle as a document with a tab;
(b) conveying a document in the document bundle to a document reading position by a document conveyance section;
(c) reading a document area of the first document including a tab portion in the document bundle which has been conveyed to obtain an image;
(d) reading a document area excluding the tab portion of a document other than the first document in the document bundle at the document reading position to obtain an image; and
(e) forming an image based on the image of the first document or the image of the document other than the first document in the document bundle onto a sheet.

16. The image forming method of claim 15, further comprising storing the image of the first document or the image of the document other than the first document in the document bundle obtained by the reading step.

17. The image forming method of claim 15, wherein the forming step includes forming the image based on the image of the first document in the document bundle, onto a first type of sheet accommodated in a first sheet feeding tray, and forming the image based on an image of the document other than the first document of the document bundle, onto a second type of sheet accommodated in a second sheet feeding tray.

18. The image forming method of claim 15, further comprising instructing to read both sides of each document in the document bundle,
wherein the reading step includes reading the area of one side of the first document with the tab in the document bundle which has been conveyed by the conveying step to obtain the image of the first document, and reading both sides of the document other than the first document in the document bundle to obtain the image based on both sides of the document other than the first document in the document bundle.

19. The image forming method of claim 18, wherein the image forming step includes forming the image based on the image of one side of the first document in the document bundle, onto a first type of sheet accommodated in a first sheet feeding tray, and forming the image based on both sides of the document other than the first document in the document bundle onto one side or both sides of a second type of sheet accommodated in a second sheet feeding tray.

20. The image forming method of claim 15, wherein the image forming step includes forming the image based on the image of the first document in the document bundle, onto one side of a first type of sheet accommodated in a first sheet feeding tray, and forming the image based on an image of the document other than the first document in the document bundle onto both sides of a second type of sheet accommodated in second sheet feeding tray.

21. The image forming method of claim 20, further comprising instructing to form images on both sides of a sheet on the basis of the image of the document in the document bundle,
wherein the image forming step includes forming the image based on the image of the first document in the document bundle onto one side of the first type of sheet, irrespective of the designation to form images on both sides of the sheet.

22. An image forming method comprising the steps of:
(a) designating to read a first document in a document bundle as a document with a tab;

(b) conveying a document in the document bundle to a document reading position by a document conveyance section;

(c) reading a whole document area of the first document including a tab portion in the document bundle which has been conveyed to obtain an image, and reading a document other than the first document in the document bundle at the document reading position to obtain an image; and (d) forming an image based on the image of the first document in the document bundle, onto a first type of sheet accommodated in a first sheet feeding tray, and forming the image based on the image of a document other than the first document in the document bundle, onto a second type of sheet accommodated in a second sheet feeding tray, wherein the image forming step is carried out after the images of a plurality of document bundles are read by repeating the document conveying step, the reading step and the image storing step.

* * * * *

UNITED STATES PATENT AND TRADEMARK OFFICE
CERTIFICATE OF CORRECTION

PATENT NO. : 7,660,001 B2  Page 1 of 1
APPLICATION NO. : 11/258643
DATED : February 9, 2010
INVENTOR(S) : Kurohata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1142 days.

Signed and Sealed this

Thirtieth Day of November, 2010

David J. Kappos
*Director of the United States Patent and Trademark Office*